(12) United States Patent
Wei et al.

(10) Patent No.: US 8,924,777 B2
(45) Date of Patent: Dec. 30, 2014

(54) CONDENSED FOTA BACKUP

(75) Inventors: Song Wei, Richardson, TX (US); Bryan Rabeler, Keller, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 346 days.

(21) Appl. No.: 13/330,116

(22) Filed: Dec. 19, 2011

(65) Prior Publication Data

US 2012/0166872 A1  Jun. 28, 2012

Related U.S. Application Data

(60) Provisional application No. 61/426,772, filed on Dec. 23, 2010.

(51) Int. Cl.
  *G06F 11/00* (2006.01)
  *G06F 11/14* (2006.01)

(52) U.S. Cl.
  CPC .................................. *G06F 11/1433* (2013.01)
  USPC .............................. 714/6.3; 714/6.1; 717/168

(58) Field of Classification Search
  CPC ..... G06F 12/0246; G06F 3/064; G06F 21/78; G06F 3/0619; G06F 3/0622; G06F 2212/1016; G06F 3/0614; G06F 11/10; G06F 11/1433; G06F 11/1438; G06F 11/1466; G06F 11/3644; G06F 12/00; G06F 12/00607; G06F 12/0804
  USPC .............................. 714/4.11, 6.1, 6.3; 717/168
  See application file for complete search history.

(56) References Cited

U.S. PATENT DOCUMENTS

| | | | |
|---|---|---|---|
| 7,689,981 B1 * | 3/2010 | Gustafson | 717/168 |
| 7,802,129 B2 * | 9/2010 | Slyz et al. | 714/5.1 |
| 8,213,921 B2 * | 7/2012 | Chen et al. | 455/418 |
| 8,561,049 B2 * | 10/2013 | Peleg et al. | 717/168 |
| 8,612,538 B2 * | 12/2013 | Hodson et al. | 709/217 |

(Continued)

OTHER PUBLICATIONS

European Search Report dated May 16, 2012 in connection with European Patent Application No. 11195578; 5 pages.

(Continued)

*Primary Examiner* — Bryce Bonzo
*Assistant Examiner* — Elmira Mehrmanesh

(57) ABSTRACT

A method and apparatus update an image stored in a memory of a device. A next block writing index n for updating a first target memory block of the memory is determined. Backup data is written to a backup block of the memory when n is an even number. The first target memory block is updated with the new data. The backup data is calculated based on a binary operation between new data corresponding to n and old data stored in a second target memory block corresponding to n+1, and the binary operation has reversibility. If n is the last block writing index, then the binary operation is not used and the backup data is the same as the new data.

20 Claims, 6 Drawing Sheets

(56) References Cited

U.S. PATENT DOCUMENTS

| | | |
|---|---|---|
| 2005/0055595 A1* | 3/2005 | Frazer et al. .................. 713/400 |
| 2005/0160257 A1 | 7/2005 | Kruger et al. |
| 2005/0251799 A1 | 11/2005 | Wang |
| 2006/0150177 A1 | 7/2006 | Liu et al. |
| 2007/0150524 A1* | 6/2007 | Eker et al. ..................... 707/203 |
| 2008/0101119 A1* | 5/2008 | Park ......................... 365/185.11 |
| 2008/0172584 A1 | 7/2008 | Meller et al. |
| 2008/0216066 A1* | 9/2008 | Oh ................................ 717/173 |
| 2009/0094414 A1 | 4/2009 | Hsu et al. |
| 2009/0106580 A1 | 4/2009 | Slyz et al. |
| 2010/0229068 A1 | 9/2010 | Yang et al. |
| 2011/0004871 A1* | 1/2011 | Liu ............................... 717/173 |

OTHER PUBLICATIONS

International Search Report dated Aug. 1, 2012 in connection with International Patent Application No. PCT/KR2011/010053; 3 pages.
Written Opinion dated Aug. 1, 2012 in connection with International Patent Application No. PCT/KR2011/010053; 5 pages.

* cited by examiner

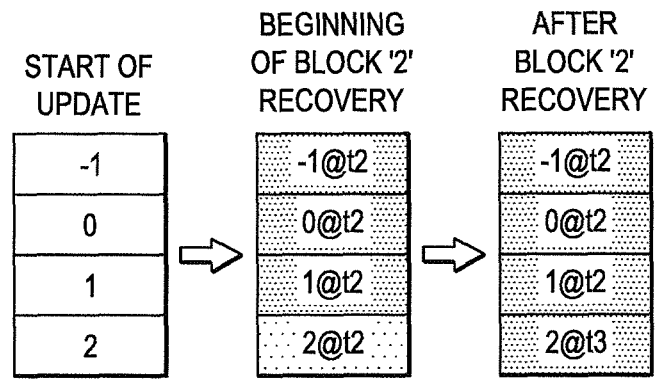
FIG. 6B
$$\boxed{0@t2} = \boxed{2@t3} \text{ XOR } \boxed{-1@t3}$$
FIG. 6C
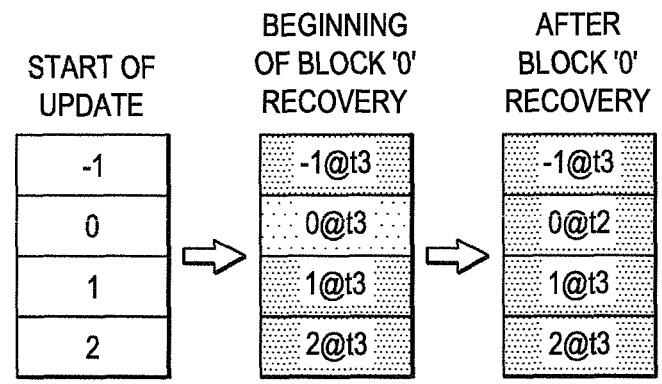
FIG. 6D

CONDENSED FOTA BACKUP

CROSS-REFERENCE TO RELATED APPLICATION(S) AND CLAIM OF PRIORITY

The present application is related to U.S. Provisional Patent Application No. 61/426,772, filed Dec. 23, 2010. Provisional Patent Application No. 61/426,772 is assigned to the assignee of the present application and is hereby incorporated by reference into the present application as if fully set forth herein. The present application hereby claims priority under 35 U.S.C. §119(e) to U.S. Provisional Patent Application No. 61/426,772.

TECHNICAL FIELD OF THE INVENTION

The present application relates generally to FOTA (Firmware Over-The-Air) updates and, more specifically, to a method and apparatus for performing a condensed FOTA backup during a FOTA update.

BACKGROUND OF THE INVENTION

A current FOTA (Firmware-Over-The-Air) update client writes a backup flash block before updating every flash block in an image of a device that is capable of wireless communication. In most cases flash block writing time accounts for most of the total image update time. So the current FOTA update client spends up to 50% of the total update time on writing backup blocks.

SUMMARY OF THE INVENTION

According to an aspect of the present disclosure, a method for updating an image stored in a memory of a device is provided. A next block writing index n for updating a first target memory block of the memory is determined. Backup data is written to a backup block of the memory when n is an even number and the first target memory block is updated with the new data. The backup data is calculated based on a binary operation between new data corresponding to n and old data stored in a second target memory block corresponding to n+1, and the binary operation is reversible. If n is the last block writing index, then the binary operation is not used and the backup data is the same as the new data.

According to another aspect of the present disclosure, an apparatus for updating an image stored in a memory of a device is provided. The apparatus includes a flash memory and a processor. The flash memory includes a backup block and a plurality of image blocks, and stores the image in the plurality of image blocks. The processor determines a next block writing index n for updating a first target image block of the memory, writes backup data to a backup block of the flash memory when n is an even number, and updates the first target image block with the new data. The backup data is calculated based on a binary operation between new data corresponding to n and old data stored in a second target image block corresponding to n+1, and the binary operation is reversible. If n is the last block writing index, then the binary operation is not used and the backup data is the same as the new data.

According to yet another aspect of the present disclosure, a non-transitory computer-readable medium for use in a wireless device is provided. The non-transitory computer-readable medium is coupled to one or more processors and stores a plurality of instructions. The plurality of instructions cause the one or more processors to determine a next block writing index n for updating a first target image block of the memory, write backup data to a backup block of the flash memory when n is an even number, and update the first target image block with the new data. The backup data is calculated based on a binary operation between new data corresponding to n and old data stored in a second target image block corresponding to n+1, and the binary operation is reversible. If n is the last block writing index, then the binary operation is not used and the backup data is the same as the new data.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 5A-5B illustrates an image update process according to an embodiment of the present disclosure;

FIGS. 6A-6D illustrate examples for recovering an image update process that is interrupted while writing an image block, according to an embodiment of the present disclosure;

DETAILED DESCRIPTION OF THE INVENTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device that is capable of wireless communication.

Figure 1:
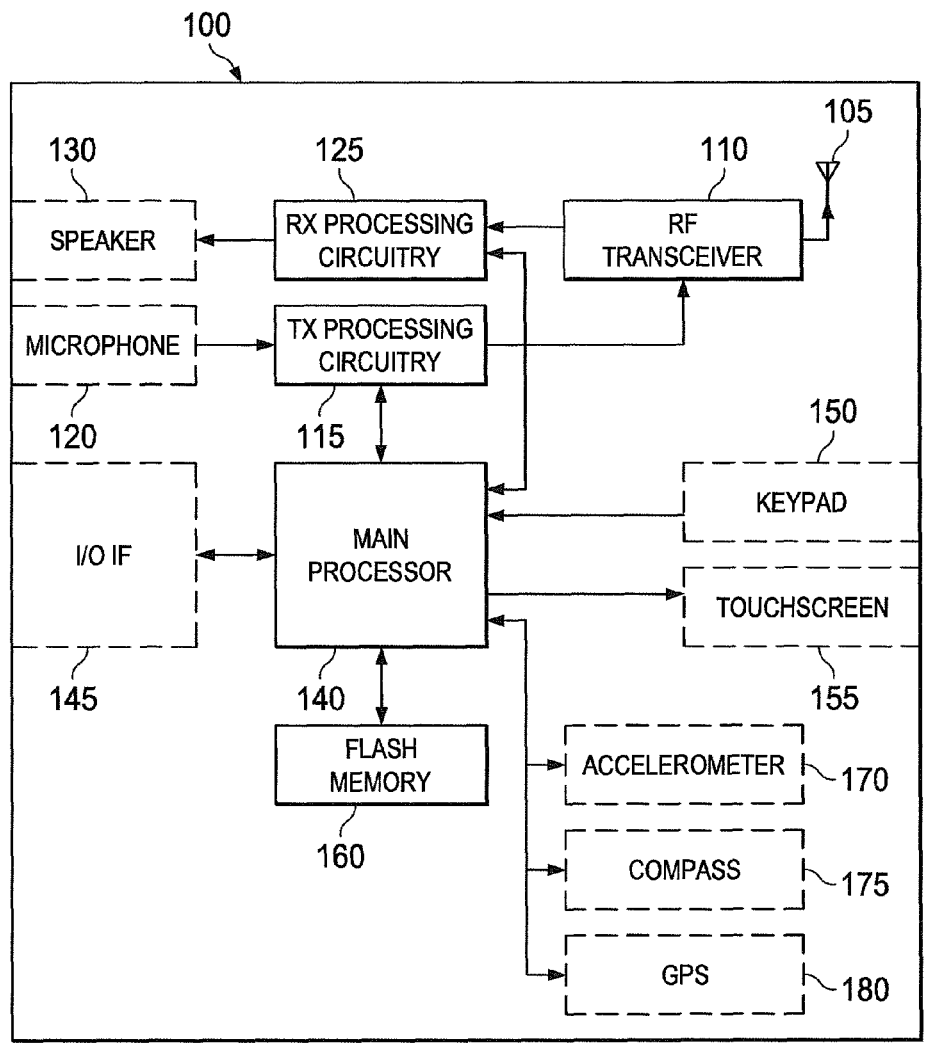
FIG. 1 illustrates a wireless communication device according to an embodiment of the present disclosure.

FIG. 1 illustrates a wireless communication device according to an embodiment of the present disclosure. Device 100 includes an antenna 105, an RF (radio frequency) transceiver 110, TX (transmission) processing circuitry 115, RX (reception) processing circuitry 125, a main processor (or controller) 140, and a flash memory 160. In addition, device 100 may also include a microphone 120, a speaker 130, an input/output (I/O) interface 145, a keypad 150, a touchscreen 155, accelerometer 170, compass 175, and global positioning system (GPS) component 180. The broken lines in FIG. 1 indicate optional components depending on the capabilities of device 100. The present disclosure is not limited to configuration illustration in FIG. 1.

Device 100 may be any device that is capable of wireless communication, such as a laptop computer, a personal computer, a tablet device, an electronic reading device, a mobile station (MS), a personal digital assistant (PDA) device equipped with a wireless modem, a two-way pager, a personal communication system (PCS) device, and such.

Main processor 140 may be implemented as a microprocessor or microcontroller. Main processor 140 executes basic operating system (OS) program, platform, firmware, and such, which may be stored in flash memory 160 in order to control the overall operation of the device 100. In one embodiment in which the device is a wireless mobile station, main processor 140 controls the reception of forward channel signals and the transmission of reverse channel signals by RF transceiver 110, RX processing circuitry 125, and TX processing circuitry 115, in accordance with well known principles. Main processor 140 is also capable of controlling and/or interfacing with GPS 180 in order to determine the location of device 100.

Main processor 140 is also capable of executing other processes and programs that are resident in flash memory 160. Main processor 140 can move data into or out of memory 160, as required by an executing process. Main processor 140 may also be coupled to I/O interface 145. I/O interface 145 provides device 100 with the ability to connect to other devices such as laptop computers and handheld computers. I/O interface 145 is the communication path between these accessories and main processor 140.

Main processor 140 may also be coupled to touchscreen (or a display unit) 155. In some embodiments, main processor 140 may also be coupled to keypad 150. Touchscreen 155 and keypad 150 are used by the end-user of the mobile station to enter data into device 100. Touchscreen 155 is capable of rendering text and/or graphics. Touchscreen 155 may be implemented as a liquid crystal diode (LCD) display, a light emitting diode (LED) display, and such. Alternate embodiments use other types of displays. Touchscreen 155 is the hardware interface with which a user can input custom gestures. In an embodiment, a dedicated area of touchscreen 155 may be dedicated for receiving custom gestures.

The flash memory 160 is coupled to main processor 140. The flash memory 160 may be comprised of any non-volatile storage device. The flash memory 160 stores the firmware that provides the basic operational control of device 100. In an embodiment, the flash memory 160 may also store applications. Though not illustrated, the device 100 may also include other types of storage such as random access memory (RAM) for temporarily storing programs and other storage devices for storing other types of user data.

The device 100 also supports wireless communication. The RF transceiver 110 receives, from antenna 105, an incoming RF signal transmitted through a wireless communication network. The RF transceiver may support one or more wireless communication protocols. The RF transceiver 110 down-converts the incoming RF signal to produce an intermediate frequency (IF) or a baseband signal. The IF or baseband signal is sent to RX processing circuitry 125 that produces a processed baseband signal by filtering, decoding, and/or digitizing the baseband or IF signal to produce a processed baseband signal. RX processing circuitry 125 transmits the processed baseband signal to speaker 130 (i.e., voice data) or to main processor 140 for further processing (i.e., web browsing).

TX processing circuitry 115 receives analog or digital voice data from microphone 120 or other outgoing baseband data (i.e., web data, e-mail, interactive video game data) from main processor 140. TX processing circuitry 115 encodes, multiplexes, and/or digitizes the outgoing baseband data to produce a processed baseband or IF signal.

RF transceiver 110 receives the outgoing processed baseband or IF signal from TX processing circuitry 115. RF transceiver 110 up-converts the baseband or IF signal to an RF signal that is transmitted via antenna 105.

In some embodiments, device 100 may include location and movement detection features such as accelerometer 170, compass 175, and GPS component 180.

Figure 2:
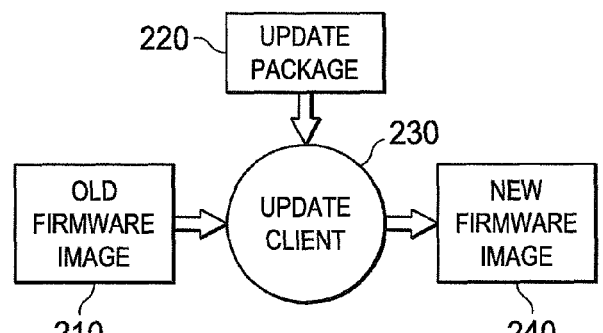
FIG. 2 illustrates a FOTA update process according to the principles of the present disclosure.

FIG. 2 illustrates a FOTA update process according to the principles of the present disclosure. The FOTA update client 230 works on a wireless communication device (e.g. the wireless communication device 100) to handle the update of the wireless communication device. To this end, the FOTA update client 230 (also referred to as the image update client 230 or update client 230) uses an update package 220 to perform this transformation. The update package 220 contains the information necessary to produce the new firmware image 240. As such, the wireless communication device receives data packets that include portions of the update package 220 through the RF transceiver and processes the received data packets in the RX processing circuitry. The main processor executes the update client 230 to update the old firmware image 210 according to the received update package 220 by updating the flash blocks that correspond to the portions of the old firmware image 210 that are to be updated. According to an embodiment, the update client 230 may be implemented in software. According to some embodiments, the update client 230 may be included in the firmware that is stored in the flash memory or implemented in hardware as a Field Programmable Gate Array (FPGA) or an Application Specific Integrated Circuit (ASIC).

The firmware image resides on the flash memory 160 of the wireless communication device 100. The characteristics of the flash memory 160 define the challenge that embodiments of the present disclosure deal with.

In certain embodiments, the FOTA update client 230 works on a wire-line communication device (e.g. a set-top box, and the like) to handle the update of the communication device. For example, the FOTA update client 230 can update flash blocks on the set-top box (or other specified wire-line device) for a television. In addition, the update package can be stored on a standard definition (SD) card or a universal serial bus (USB) device. Alternatively, the update package can be obtained over an Ethernet network or the like.

Figure 3:
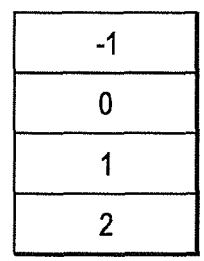
FIG. 3 illustrates a portion of a flash memory, according an embodiment of the present disclosure.

FIG. 3 illustrates a portion of a flash memory, according an embodiment of the present disclosure. Four flash blocks are illustrated. According to an embodiment, the image spans three image blocks represented by block IDs '0', '1', and '2'. The backup block is represented by block ID '−1'. The block IDs may correspond to physical or logical blocks according to the embodiment. In the present disclosure the phrase "block ID '0'" is synonymous with the phrase "block '0'", and "backup block '−1'" is synonymous with "backup block." A flash block is a continuous chunk of flash memory. In most cases, all flash blocks on the same flash memory chip have the same size. The notion of the flash block is important because it is the smallest unit of flash erasure operation. Whenever the update client needs to rewrite (i.e. update) data stored in a flash block, it has to erase that flash block first. And upon erasure, all data stored in the flash block will be lost. For descriptive purposes, each block of a flash memory is assigned a number identification (hereinafter referred to as a "block id"). An in-place update client produces the image where the old image resides. Ideally, an in-place update client uses very few extra flash blocks to aid its operation. As such, the in-place update client does not make a complete backup copy of the old image before the update.

When the update client is updating the image, it is possible that the device runs out of power, or the battery is removed from the device. In this situation, the update process is terminated by power failure. Power failure recovery requires that the update client is able to correctly transform the half-processed image to the new image the next time the device boots up.

The power failure recovery requirement for an in-place FOTA update client leads to the use of backup blocks. This problem is illustrated using a simple example. Let's say the update client is going to update the image shown in FIG. 3. However, to further illustrate the problem, the power failure recovery problem will be described with respect to a situation in which there is no backup block (i.e. without block '−1').

Figure 4A:
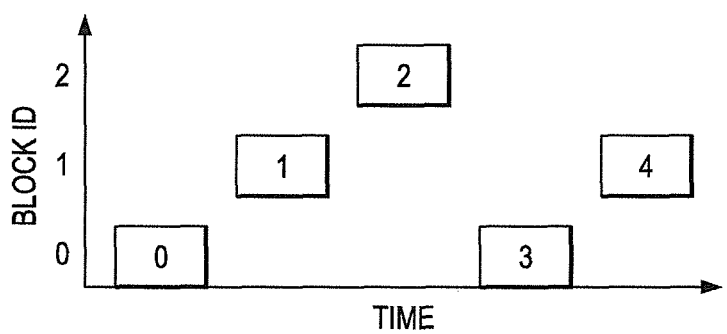
FIGS. 4A and 4B illustrate an update process without considering a backup operation, according to the principles of the present disclosure.
Figure 4B:
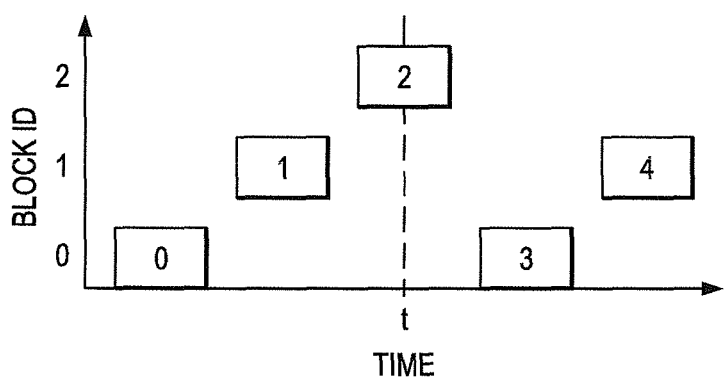

FIGS. 4A and 4B illustrate an update process without considering a backup operation, according to the principles of the present disclosure. The update process is done through writing the image blocks in a sequence. The image block writing sequence may be predefined, determined just prior to the update, or determined dynamically. In the present disclosure, the term "sequence" does not require that the image blocks are updated in sequential order according to the block ID. This sequence, and the new data written at each block write, is calculated from the old image and the update package by the update client. According to an embodiment, the image block writing sequence index starts from '0'. The rectangles denote phone image block writes with their sequence number. As shown, the first block overwritten is block '0' with sequence index '0', and the last block overwritten is block '1' with sequence index '4'. In the present disclosure, the phrase "block write sequence index '0'" is synonymous with "block write index '0'" and "block write '0'". Let's assume the power failure happens at a time t, as illustrated in FIG. 4B.

All data that is stored in RAM during the firmware update process will be lost upon power failure. At time t the update client has already erased block '2' prior to carrying out image block write sequence index '2'. Because no backup data is stored in the flash memory, the data stored in block '2' before this block write is lost. By t, block '2' may be only half written, so the next time the phone boots up, the update client can only see a corrupted block '2'.

Because of the in-place nature of the update client, no backup copy of the image is available. The data in block '2' either before or after image write sequence index '2' is necessary to continue the update process. However, this data is not stored on flash because no backup operation is conducted. Neither does the update package contain this data, because it would be redundant if the power failure did not occur. As such, the update process cannot resume.

A solution that is currently used is to use the backup block '−1' to back up the next image block to be written before each image block write. For example, using the image block writing sequence of FIG. 4A, the backup block '−1' is written with the content to be written into block '0' prior to image block writing sequence index '0', the backup block '−1' is written with the content to be written into block '1' prior to image block writing sequence index '1', and so on, such that prior to performing the image block writing sequence index '4', the backup block '−1' is written with the content to be written into block '1'.

Therefore, when a power failure occurs at t while writing block '2' during sequence index '2' (as shown in FIG. 4B), the image update process can be restored after a reboot by copying the content to be written into block '2' from the backup block '−1', thereby allowing the image update client to resume the image update process from sequence index '2'. Similarly, if a power failure occurs while writing block '1' during sequence index '4', the image update process can be restored after a reboot by copying the content to be written into block '1' from the backup block '−1'. If the power failure occurs while writing the backup block '−1', the image update process can be restored be by simply determining the last block to be updated successfully and rewriting the backup block '−1' with the update content corresponding to the next sequence index. Consequently, each image block update requires at least one backup operation. Embodiments of the present disclosure improve on this inefficiency.

Figures 5A, 5B, 6A:
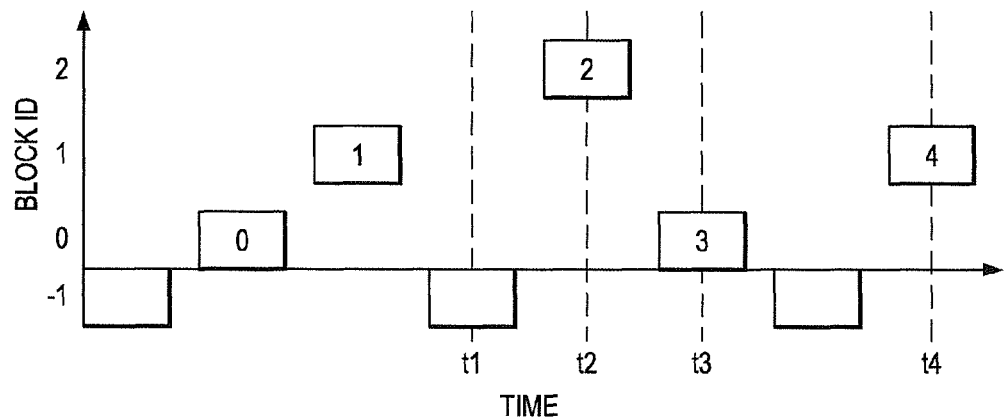

FIGS. 5A-5B illustrates an image update process according to an embodiment of the present disclosure. The flash memory uses the same flash layout shown in FIG. 3, which includes one backup block with block ID '−1' and three blocks with block IDs '0', '1', and '2' in the flash image (denoted along the vertical axis). In addition, the image blocks are updated in the same image block writing sequence illustrated in FIG. 4, which includes five image block update operations with corresponding sequence indices '0', '1', '2', '3', and '4' (denoted with numbers in the corresponding rectangles). It is noted that this is merely an example to illustrate the image update process according to an embodiment of the present disclosure, and that the principles of the image update process may be applied by an image update client to update an image in a flash memory that includes greater or fewer image blocks and/or image block writing sequences that include greater or fewer image block update operations.

As shown in FIG. 5A, the backup block (block ID '−1') is written only once for every two block updates. The backup block writes are denoted with blank rectangles. Assuming '0' is considered to be an even number, the image update client only writes the backup block '−1' before block writing sequence indices that are even numbers (i.e. '0', '2', and '4'). According to an embodiment, if the next block writing sequence index is an even number, the data written in the backup block '−1' is the bitwise XOR (exclusive or) of the new data to be written corresponding to the next even image block write sequence index and the old data stored on the target block ID of the following odd image block write sequence index. However, if the even image block write sequence index is the last in the sequence, the corresponding new data to be written is backed up as is to the backup block '−1'. Furthermore, if the next block writing sequence index is an odd number, no data is written into the backup block '−1'. It is noted that while embodiments present disclosure are described as using the XOR operation, other binary operations that have the reversible property may be used.

For the purpose of understanding the following description, by t1, block write index '0' and block write index '1' (for writing block IDs '0' and '1', respectively) have been completed, and the image update process has only partially written the backup block '−1'. That is, at t1, the data being written into the backup block '−1' is the XOR of the new data content corresponding to the next block write index (i.e. data content corresponding to block write '2') and the old data content stored in the target block ID of the following odd image block write sequence index (i.e. data content corresponding to block write '0'). The data to be written into the backup block before t2 is shown in FIG. 5B. The left-most rectangle, with notation "−1@t2", denotes the content of block '−1' that is stored by time t2 (i.e. the data written to the backup block '−1' before block write '2'). The other two rectangles on the right use the same notation.

Furthermore, at t2, the backup block write is complete, and block write index '2' (for updating block '2') is partially completed. At t3, the block write index '2' is complete, and block write index '3' (for updating block '0') is partially completed. No backup block is written at t3 because, after block write index '2' is complete, the next block write index ('3') is an odd number. At t4, block write index '3' is complete, the backup block has been written, and block write '4' (for updating block '1') is partially completed. Here, because block write index '4' is the last block write in the sequence, the backup block '−1' is written with the data content corresponding to block write '4' without performing an XOR.

According to an embodiment, if power failure occurs at t1, only the backup block '−1' is corrupted, and the image blocks (i.e. blocks '0'-'3') are intact. Therefore, the image update process may resume without having to recover any of the image blocks. If power failure occurs at t4, the update client simply copies the contents of the backup block '−1' into block '1' during recovery. This is because t4 corresponds to the final block write.

FIGS. 6A-6D illustrate examples for recovering an image update process that is interrupted while writing an image block, according to an embodiment of the present disclosure. In FIGS. 6A and 6B, the image update process is interrupted at t2. For example, if the image update process is interrupted due to a power failure occurring at t2, then block '2' is corrupted during block write '2'. As discussed, before block write '2', the backup block (i.e. "−1@t2") is written with contents derived by XOR-ing the contents to be written corresponding to block write '2' (i.e. "2@t3") and the old data stored on the target block of the odd image block write thereafter (i.e. "0@t2"). Due to the nature of the XOR operation, the next time the device boots up, the update client may recover the content of block '2' to resume the image block write sequence to the point after image block write '2' is completed by using the calculation illustrated in FIG. 6A. The flash memory layout at the beginning of the image update, at the beginning of block '2' recovery, and after block '2' recovery are shown in FIG. 6B.

In FIGS. 6C and 6D, the image update process is interrupted at t3. For example, if the image update process is interrupted due to a power failure occurring at t3, then block '0' is corrupted during block write '3'. The backup block is not written based on the contents to be written corresponding to block write index '3'. However, as discussed, before block write '2', the backup block (i.e. "−1@t2") is written with contents derived by XOR-ing the contents to be written corresponding to block write '2' (i.e. "2@t3") and the old data stored on the target block of the odd image block write thereafter (i.e. "0@t2"). Due to the nature of the XOR operation, the next time the device boots up, the update client may recover the old data stored on the target block of the block write '3' (i.e. the content of block '0') to resume the image block write sequence to the point before image block write '3' is performed by using the calculation illustrated in FIG. 6C. The flash memory layout at the beginning of the image update, at the beginning of block '0' recovery, and after block '0' recovery are shown in FIG. 6D. From FIGS. 6C and 6D, it can be seen that the state of the image may be recovered to that just before block write '3'. The update client can then resume the update process.

The backup algorithm, according to an embodiment, will now be described using the following definitions and short hand:

XOR: The bitwise exclusive or operation. The XOR operation has the following reversible property according to Equation 1:

if $XOR(a,b)=c$, then $XOR(a,c)=b$ and $XOR(b,c)=a$     [Eqn. 1]

Flash block: A continuous, fixed size chunk of flash memory which is the smallest unit of flash erasure operation. The present disclosure is only concerned with two types of flash blocks, image blocks and the backup block.

Flash block ID: A numeric identifier for each flash block.

N: Total number of flash blocks in the image. For a meaningful update process, N>0.

FD(i): Data on flash block i, where i is the block ID.

Phone image block: The flash block that holds a portion of the image. In the present disclosure, the block ID (i) of the image blocks starts from '0'.

Backup block: A flash block allocated for the backup operation of the update client. In the present disclosure, the backup block ID is '−1'

Phone image block writing sequence: A sequence in which the update client updates the image blocks in the flash device. In the present disclosure, the image block writing sequence index starts from '0'.

L: The image block writing sequence length. For a meaningful update process, L>0.

$FD(i,n)$: Valid data on flash block i before image block write n, $\forall n \in \{0, 1, \ldots, L-1\}$, and valid data on flash block i after all writes, when n=L.

S(n): Valid intermediate image state before image block write n. The phone flash is in state S(n) only under the conditions according to Equation 2:

$FD(i)=FD(i,n), \forall i \in \{0,1,\ldots,N-1\}$     [Eqn. 2]

T(n): Target block ID of image block write n.

WD(n): Data to be written by image block write n. By definition, the following relationship according to Equation 3 is satisfied:

$FD(T(n),n+1)=WD(n), \forall n \in \{0,1,\ldots,L-1\}$     [Eqn. 3]

I: The image block writing sequence index of the block write operation interrupted by power failure. If the power failure has not corrupted any image blocks, I=−1.

Requirements for Update Client

1. $T(n) \neq T(n+1) \; \forall n \in \{0, 1, \ldots, L-2\}$

2. If power failure occurs, the next time the device boots up, the update client is able to determine I.

3. If power failure occurs, the next time the device boots up, the update client is able to resume the update process if the state of phone image is recovered to S(n), $\exists n \in \{0, 1, \ldots, L-1\}$.

According to an embodiment of the present disclosure, the following backup algorithm, which reflects the backup process described with respect to FIGS. 5A-5B, is executed before every image block write n, ∀n∈{0, 1, ..., L−1}:
1. If n is odd, do nothing.
2. If n is even and n=L−1: write WD(n) to the backup block.
3. If n is even and n<L−1: write (WD(n) XOR FD(T(n+1))) to the backup block.

Figure 7:
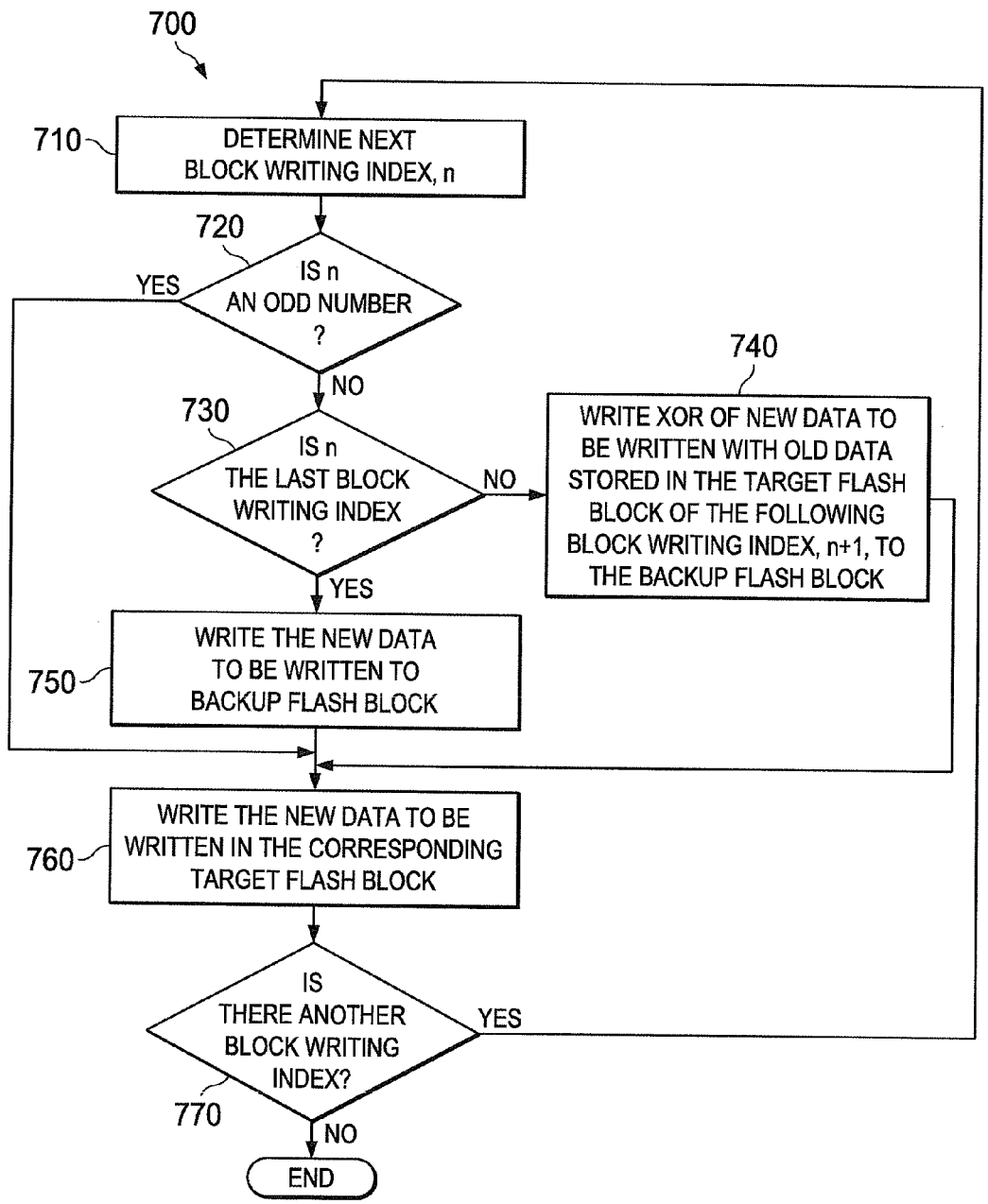
FIG. 7 illustrates an image update process with backup according to an embodiment of the present disclosure.

FIG. 7 illustrates an image update process with backup according to an embodiment of the present disclosure. Process 700 may be performed by the image update client 230 of FIG. 2. As previously discussed, the image update client 230 may be implemented in software that is stored in a non-transitory storage medium and can be executed by a one or more processors (e.g. main processor 140 of FIG. 1) or in hardware as an FPGA or an ASIC.

In block 710, the update client determines (e.g., reads) the next block writing index n. In block 720, the update client determines whether the next block writing index n is an odd number. If the next block writing index is an odd number, the update client proceeds to block 760 and writes the new data to be written in the corresponding target flash block. For example, in FIG. 5A, when the image block writing sequence is at block write index '1', block '1' is written with the corresponding content. Or when the image block writing sequence is at block write index '3', block '0' is written with the corresponding content.

Otherwise, if the next block writing index is not an odd number, the update client, in block 730, determines whether the next block writing index is the last block writing index. If the next even block writing index is not the last block writing index, the update client, in block 740, calculates the XOR of the new data to be written corresponding to the next even block writing index n and the old data stored on the target block ID of the following odd image block write sequence index, n+1, as discussed with reference to FIG. 5A. The result of the XOR calculation is stored in the backup flash block. Thereafter, the update client proceeds to block 760 and writes the new data to be written corresponding to the next even block writing index n into the corresponding target flash block. This is similar to the operation for the block writing index '2' of FIG. 5A.

If the next block writing index n is not an odd number and is also the last block writing index, the update client, in block 750 writes the new data to be written to the backup flash block. Thereafter, the update client proceeds to block 760 and writes the new data to be written corresponding to the next even block writing index n into the corresponding target flash block. This is similar to the operation for the block writing index '4' in FIG. 5A.

In block 770, the update client determines whether there is another image block writing operation. If so, the update client returns to block 710. Otherwise, the image update process 700 is complete.

According to an embodiment of the present disclosure, the following recovery algorithm, which reflects the recovery process described with respect to FIGS. 6A-6D, is executed to recover from an interruption during an image update process (e.g. after the flash memory device has booted up from a power failure and the update client has determine I:
1. If I=−1, do nothing.
2. If I>=0, and I is odd: write (FD(T(I−1)) XOR FD(−1)) to flash block T(I).
3. If I=L−1, and I is even: write FD(−1) to the flash block T(L−1)
4. If 0<=I<L−1, and I is even: write (FD(T(I+1)) XOR FD(−1)) to flash block T(I).

Thereafter, the update client may resume the image update process.

Figure 8:
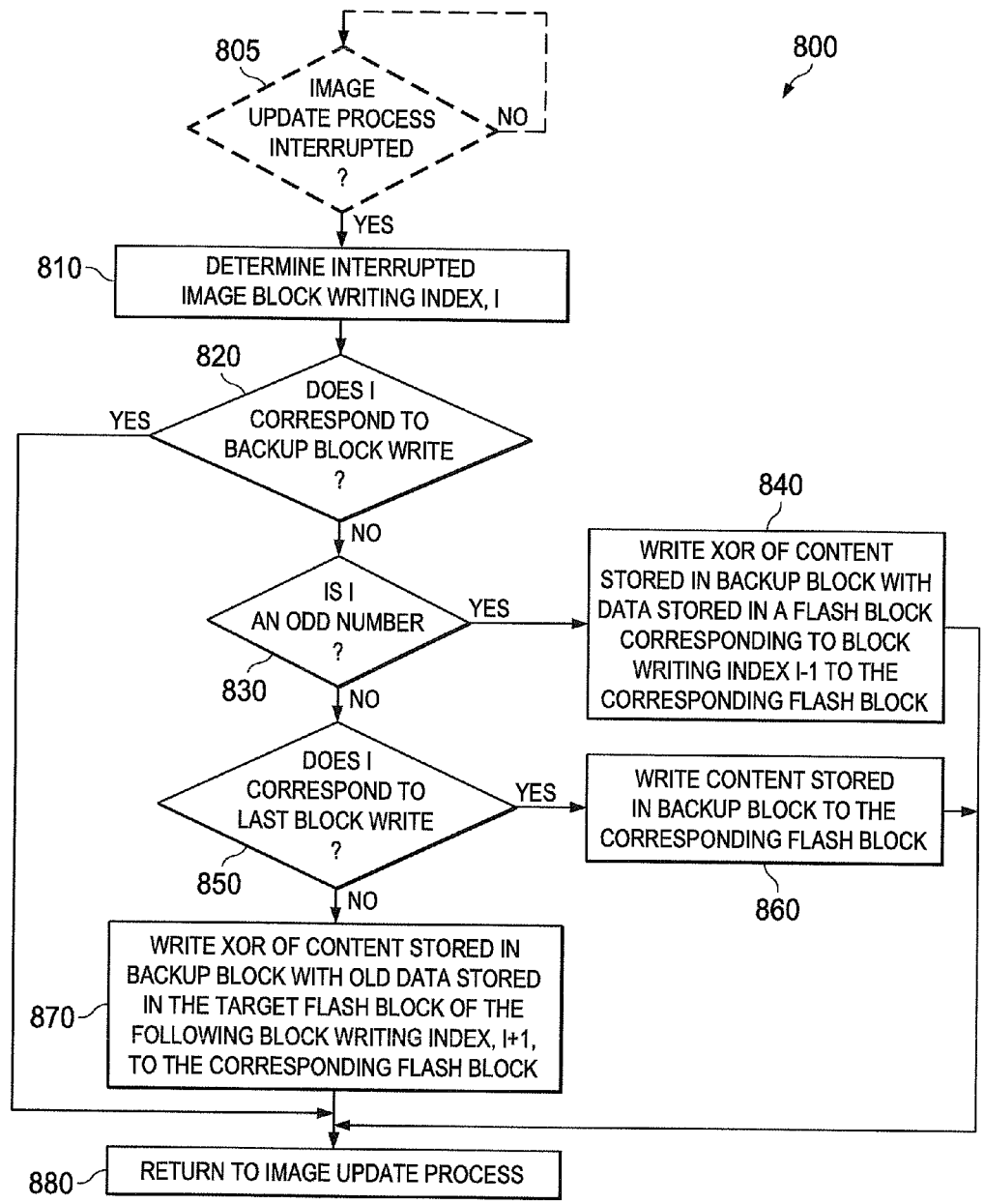
FIG. 8 illustrates an image update recovery process with backup according to an embodiment of the present disclosure.

FIG. 8 illustrates an image update recovery process with backup according to an embodiment of the present disclosure. Process 700 may be performed by the image update client 230 of FIG. 2. As previously discussed, the image update client 230 may be implemented in software that is stored in a non-transitory storage medium and can be executed by a one or more processors (e.g. main processor 140 of FIG. 1) or in hardware as an FPGA or an ASIC. According to an embodiment, process 800 may be running concurrently with the image update process 700. In that embodiment, the update client may perform optional block 805 concurrently while performing the image update process 700. Alternatively, the image update recovery process 800 may be triggered by the image update process 700 or separately triggered after the device reboots when the image update process 700 is interrupted due to a power failure.

In block 810, the image update client determines the interrupted block writing index I. According to an embodiment, the interrupted block writing index I may be determined by first identifying a corrupted memory block. The interrupted block writing index I may correspond to the next block writing index n when the image update process is interrupted while writing to an image block. Furthermore, the interrupted block writing index I may indicate a '−1' when the image update process is interrupted while writing to a backup block.

In block 820, the update client determines whether the interrupted block writing index I corresponds to a backup block write. If the interrupted block writing index I does correspond to the backup block write, the update client proceeds to block 880 and resumes the image update process. According to an embodiment, block 880 corresponds to returning to block 710 of the image update process 700.

In block 830, the update client determines whether the interrupted block writing index I is an odd number. If so, the image update client, in block 840, calculates the XOR of the content corresponding to the last completed block write operation with the content stored in the backup block. The XOR result is then written to the flash block that corresponds to the interrupted block writing index I. This recovery operation is similar to the situation illustrated in FIGS. 6C and 6D. Thereafter, the update client proceeds to block 880 and resumes the image update process.

In block 850, the update client determines whether the interrupted block writing index I corresponds to the last block write. If so, the update client proceeds to block 860 and writes the content stored in the backup block to the corresponding flash block. Thereafter, the update client proceeds to block 880 and resumes the image update process.

If the interrupted block writing index I does not correspond to a backup block write, is not an odd number, and does not correspond to the last block write, the update client, in block 870, calculates the XOR of the content stored in the backup block with old data stored in the target flash block of the following block writing index, I+1. The XOR result is written to the flash block corresponding to the interrupted block writing index I. This recovery operation is similar to the situation illustrated in FIGS. 6A and 6B. Thereafter, the update clients proceeds to block 880 and resumes the image update process.

According to an embodiment of the present disclosure, the backup and recovery operations may be adapted to handle flash memory with different block sizes. A backup block that is large enough to contain the largest image block is allocated. The smaller blocks are then padded to the size of the backup block before each XOR operation. Furthermore, it is possible that the update client operates on logical blocks instead of flash blocks.

According to an embodiment, it is also possible to replace the XOR operation with any other operations X( ) and Y( ) that have the reversible property as shown in Equation 4:

if $X(a,b)=c$ or $X(b,a)=c$, then $Y(a,c)=b$ or $Y(c,a)=b$ and $Y(b,c)=a$ or $Y(c,b)=a$  [Eqn. 4]

Compared to the existing solutions, embodiments of the present disclosure may reduce the number of backup block writes by half, and thus reduce the total number of block writes by 25%. The added computation (XOR) is a linear operation with a small coefficient. As such, the added computation time is negligible. Therefore, the total update time may be reduced substantially.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for an updating an image stored in a memory of a device, the method comprising:
   writing, based on a next block writing index n for updating a first target memory block of the memory, backup data to a backup block of the memory when n is an even number and n is not the last block writing index, the backup data calculated based on a binary operation between new data corresponding to n and old data stored in a second target memory block corresponding to n+1, the binary operation having reversibility; and
   updating the first target memory block with the new data.

2. The method of claim 1, further comprising writing the new data to the backup block when n is an even number and n is the last block writing index.

3. The method of claim 1, wherein the binary operation is a bitwise XOR operation.

4. The method of claim 1, wherein the new data is received through a firmware over-the-air (FOTA) client.

5. The method of claim 1, further comprising performing an update recovery in response to an interruption of an image update process, the update recovery comprising:
   writing, based on an interrupted block writing index I, recovery data to a corrupted memory block corresponding to I when I does not correspond to a backup block write,
   wherein, when I is an odd number, the recovery data is calculated based on the binary operation between data stored in the backup block and data stored in a memory block corresponding to I−1.

6. The method of claim 5, wherein when I is an even number and does not correspond to the last block write of the image update process, the recovery data is calculated based on the binary operation between the data stored in the backup block and old data stored in the target memory block corresponding to I+1.

7. The method of claim 5, wherein when I is an even number and corresponds to the last block write of the image update process, the recovery data is the data stored in the backup block.

8. An apparatus for updating an image stored in a memory of a device, the apparatus comprising:
   a flash memory configured to store the image, the flash memory comprising a backup block and a plurality of image blocks;
   a processor configured to:
   write, based on a next block writing index n for updating a first target image block of the memory, backup data to a backup block of the flash memory when n is an even number and n is not the last block writing index, the backup data calculated based on a binary operation between new data corresponding to n and old data stored in a second target image block corresponding to n+1, the binary operation having reversibility, and
   update the first target image block with the new data.

9. The apparatus of claim 8, wherein the processor is further configured to write the new data to the backup block when n is an even number and n is the last block writing index.

10. The apparatus of claim 8, wherein the binary operation is a bitwise XOR operation.

11. The apparatus of claim 8, further comprising a radio frequency (RF) receiver configured to receive wireless signals, wherein the new data is received through a firmware over-the-air (FOTA) client.

12. The apparatus of claim 8, wherein the processor is further configured to perform an update recovery in response to an interruption of an image update process, the update recovery comprising:
   writing, based on an interrupted block writing index I, recovery data to a corrupted image block corresponding to I when I does not correspond to a backup block write,
   wherein, when I is an odd number, the recovery data is calculated based on the binary operation between data stored in the backup block and data stored in an image block corresponding to I−1.

13. The apparatus of claim 12, wherein when I is an even number and does not correspond to the last block write of the image update process, the recovery data is calculated based on the binary operation between the data stored in the backup block and old data stored in the target image block corresponding to I+1.

14. The apparatus of claim 12, wherein when I is an even number and corresponds to the last block write of the image update process, the recovery data is the data stored in the backup block.

15. A non-transitory computer-readable medium for use in a wireless device, the non-transitory computer-readable medium coupled to one or more processors and configured to store a plurality of instructions, the plurality of instructions configured to cause the one or more processors to:
   write, based on a next block writing index n for updating a first target image block of the memory; backup data to a backup block of the flash memory when n is an even number and n is not the last block writing index, the backup data calculated based on a binary operation between new data corresponding to n and old data stored in a second target image block corresponding to n+1, the binary operation having reversibility; and
   update the first target image block with the new data.

16. The non-transitory computer-readable medium of claim 15, wherein the plurality of instructions further are configured to cause the one or more processors to write the new data to the backup block when n is an even number and n is the last block writing index.

17. The non-transitory computer-readable medium of claim 15, wherein the binary operation is a bitwise XOR operation.

18. The non-transitory computer-readable medium of claim 15, wherein the plurality of instructions further are configured to cause the one or more processors to perform an update recovery in response to an interruption of an image update process, the update recovery comprising:

writing, based on an interrupted block writing index I, recovery data to a corrupted image block corresponding to I when I does not correspond to a backup block write, wherein, when I is an odd number, the recovery data is calculated based on the binary operation between data stored in the backup block and data stored in an image block corresponding to I−1.

19. The non-transitory computer-readable medium of claim 15, wherein when I is an even number and does not correspond to the last block write of the image update process, the recovery data is calculated based on the binary operation between the data stored in the backup block and old data stored in the target image block corresponding to I+1.

20. The non-transitory computer-readable medium of claim 15, wherein when I is an even number and corresponds to the last block write of the image update process, the recovery data is the data stored in the backup block.

\* \* \* \* \*